United States Patent
Kimata et al.

(10) Patent No.: US 9,939,804 B2
(45) Date of Patent: Apr. 10, 2018

(54) NUMERICAL CONTROL DEVICE AND NUMERICAL CONTROL METHOD

(71) Applicant: Mitsubishi Electric Corporation, Tokyo (JP)

(72) Inventors: Toshiaki Kimata, Tokyo (JP); Kotaro Nagaoka, Tokyo (JP); Naoki Nakamura, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 183 days.

(21) Appl. No.: 15/101,218

(22) PCT Filed: Dec. 13, 2013

(86) PCT No.: PCT/JP2013/083522
§ 371 (c)(1),
(2) Date: Jun. 2, 2016

(87) PCT Pub. No.: WO2015/087455
PCT Pub. Date: Jun. 18, 2015

(65) Prior Publication Data
US 2016/0349732 A1    Dec. 1, 2016

(51) Int. Cl.
*G05B 13/00* (2006.01)
*G05B 19/404* (2006.01)
(Continued)

(52) U.S. Cl.
CPC ......... *G05B 19/404* (2013.01); *G05B 19/402* (2013.01); *G05B 19/416* (2013.01);
(Continued)

(58) Field of Classification Search
CPC ... G05B 19/404; G05B 19/402; G05B 19/416
See application file for complete search history.

(56) References Cited

U.S. PATENT DOCUMENTS 4,547,847 A * 10/1985 Olig .................... G05B 19/4163
318/561
5,708,342 A * 1/1998 Nihei .................... G05B 19/416
318/568.18
(Continued)

FOREIGN PATENT DOCUMENTS

EP    0 926 577 A1    6/1999
JP    58-116092 A    7/1983
(Continued)

OTHER PUBLICATIONS

International Search Report for PCT/JP2013/083522 dated Feb. 25, 2014.

*Primary Examiner* — Vincent Tran
(74) *Attorney, Agent, or Firm* — Sughrue Mion, PLLC; Richard C. Turner

(57) ABSTRACT

To dynamically change the acceleration without trial executions of a machining program, a numerical control device, which controls a motor on the basis of a machining program that specifies a path for a drive target of the motor, includes a changing unit that changes the acceleration of the motor under the control of the motor on the basis of the inertia ratio, the acceleration-deceleration factor that can be externally input, or the current value of the motor.

16 Claims, 10 Drawing Sheets

(51) Int. Cl.
  *G05B 19/416* (2006.01)
  *G05B 19/402* (2006.01)
(52) U.S. Cl.
  CPC .............. *G05B 2219/37388* (2013.01); *G05B 2219/37621* (2013.01); *G05B 2219/41056* (2013.01)

(56) References Cited

U.S. PATENT DOCUMENTS

| | | | |
|---|---|---|---|
| 5,953,493 A * | 9/1999 | Sano | B25J 9/1664 700/245 |
| 9,612,595 B2 * | 4/2017 | Yoshino | G05B 19/404 |
| 9,755,566 B2 * | 9/2017 | Okita | H02P 29/60 |
| 2005/0137739 A1 * | 6/2005 | Yoshida | G05B 19/404 700/170 |
| 2013/0199014 A1 * | 8/2013 | Buettner | B21D 28/265 29/407.08 |
| 2014/0214202 A1 * | 7/2014 | Nammoto | B25J 9/1653 700/245 |
| 2014/0217951 A1 * | 8/2014 | Sugihara | G05B 19/19 318/600 |
| 2015/0061564 A1 * | 3/2015 | Ueda | G05B 6/02 318/601 |
| 2015/0081084 A1 * | 3/2015 | Nishiwaki | B23G 1/16 700/170 |

FOREIGN PATENT DOCUMENTS

| | | |
|---|---|---|
| JP | 2-012407 A | 1/1990 |
| JP | 4-289057 A | 10/1992 |
| JP | 5-197407 A | 8/1993 |
| JP | 8-006627 A | 1/1996 |
| JP | 9-282020 A | 10/1997 |
| JP | 11-194807 A | 7/1999 |
| JP | 11-202915 A | 7/1999 |
| JP | 2000-346738 A | 12/2000 |
| JP | 2004-103031 A | 4/2004 |
| JP | 2008-225652 A | 9/2008 |
| JP | 2010-211467 A | 9/2010 |

* cited by examiner

NUMERICAL CONTROL DEVICE AND NUMERICAL CONTROL METHOD

CROSS REFERENCE TO RELATED APPLICATIONS

This application is a National Stage of International Application No. PCT/JP2013/083522filed Dec. 13, 2013, the content of which are incorporated herein by reference in its entirety.

FIELD

The present invention relates to a numerical control device and a numerical control method.

BACKGROUND

Conventionally, in a case of machining a workpiece having a large inertia (weight) by numerically controlling a machine tool, a time constant according to the maximum inertia ratio is set in a numerical control device, and the time constant remains unchanged until the machining is finished. Therefore, when the inertia is reduced due to cutting or other machining, this makes an allowance for further accelerating or decelerating a motor. However, because the time constant remains fixed, the cycle time cannot be reduced. Accordingly, a function of selecting an optimal time constant according to the weight of a workpiece has been proposed (see, for example, Patent Literature 1).

CITATION LIST

Patent Literatures

Patent Literature 1: Japanese Patent Application Laid-open No. 2010-211467
Patent Literature 2: Japanese Patent Application Laid-open No. 2000-346738

SUMMARY

Technical Problem

According to the technique in Patent Literature 1 described above, however, a numerical control device initially operates a machine tool based on a machining program. At this time, the numerical control device estimates the weight of a workpiece, and derives an optimal time constant on the basis of the estimation result. The numerical control device records the derived time constant along with the machining program. When the numerical control device operates the machine tool again on the basis of the same machining program, this device uses the stored time constant to operate the machine tool. Therefore, there is a problem that each time the machining program or the weight of a workpiece is changed, estimation of the workpiece weight and derivation of the time constant are needed.

The present invention has been achieved to solve the above problems. An objective of the present invention is to provide cycle-time reduction effect, and vibration-suppression and overload prevention effects by means of estimating the inertia of a workpiece even while a program is being executed, and automatically changing the acceleration or the time constant to an optimal value on the basis of the estimation result while a machine tool is being operated. Further, another objective of the present invention is to provide a cycle-time reduction effect and vibration-suppression and overload prevention effects by automatically changing the acceleration or the time constant according to a state quantity other than the inertia of a workpiece, such as a load or an acceleration-deceleration factor.

The present invention has been achieved to solve the above problems and an objective of the present invention is to provide a numerical control device and a numerical control method that can dynamically change the acceleration without trial executions of a machining program.

Solution to Problem

In order to solve the problems and achieve the objectives, the present invention relates to a numerical control device that controls a motor according to a program that specifies a path for a drive target of the motor. The numerical control device includes: a changing unit that monitors a state quantity related to the motor while the motor is being controlled, and that changes an acceleration of the motor on the basis of the state quantity while the motor is being controlled.

Advantageous Effects of Invention

The numerical control device according to the present invention changes the acceleration of a motor on the basis of a state quantity of the motor even when the motor is being controlled. Therefore, it is possible to dynamically change the acceleration without trial executions of a machining program.

DESCRIPTION OF EMBODIMENTS

Exemplary embodiments of a numerical control device and a numerical control method according to the present invention will be explained below in detail with reference to the accompanying drawings. The present invention is not limited to the embodiments.

First Embodiment

Figure 1:
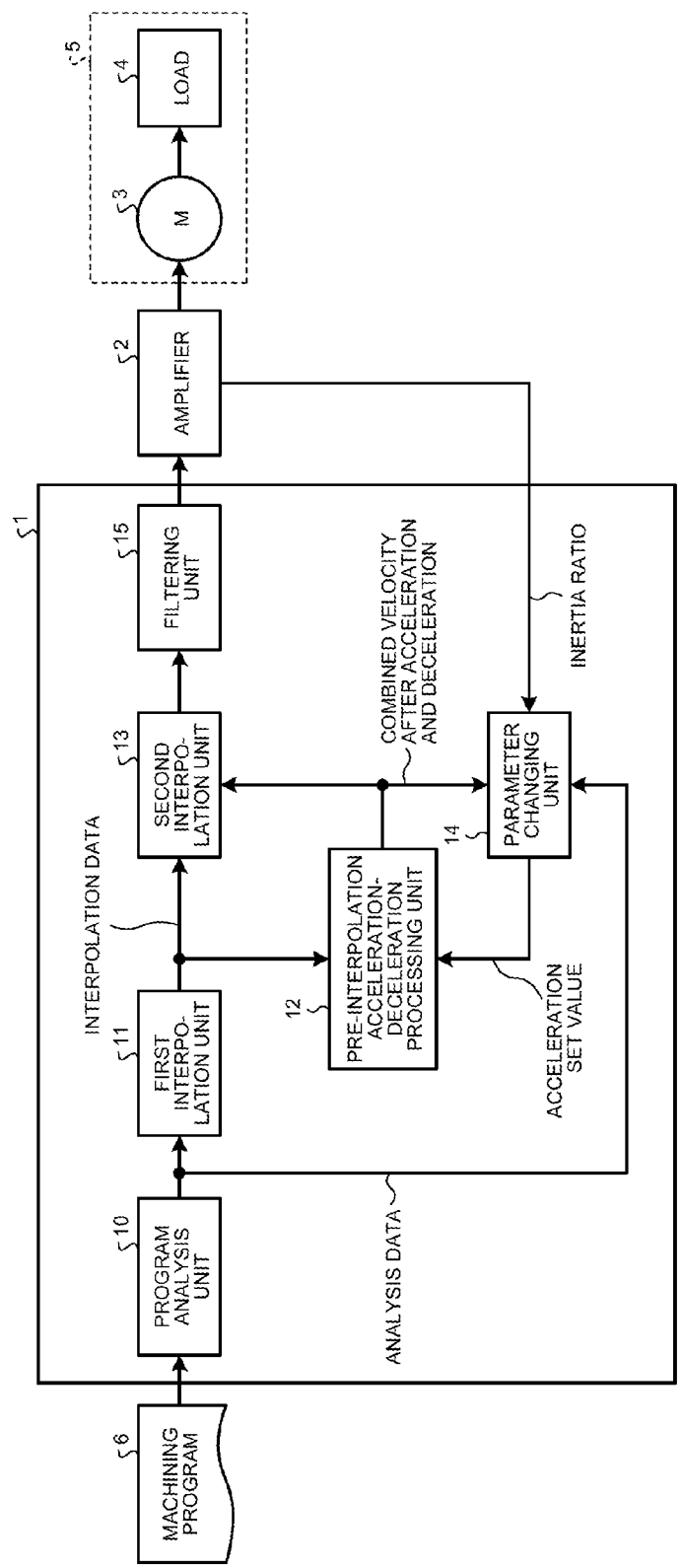
FIG. 1 is a diagram illustrating a configuration of a numerical control device according to a first embodiment.

FIG. 1 is a diagram illustrating a configuration of a numerical control device according to a first embodiment. A numerical control device 1 is connected to an amplifier 2. The amplifier 2 supplies a drive current to a motor 3. A load 4 is connected as a drive target to the motor 3. The motor 3 and the load 4 are called a "mechanical system 5". The mechanical system 5 includes one or more drive shafts (hereinafter, simply "shaft(s)") that drive the same load 4. The motor 3 and the amplifier 2 are each provided for each shaft.

The numerical control device 1 includes a program analysis unit 10, a first interpolation unit 11, a pre-interpolation acceleration-deceleration processing unit 12, a second interpolation unit 13, a parameter changing unit 14, and a filtering unit 15.

The program analysis unit 10 analyzes an externally-input machining program 6 and outputs the analysis result as analysis data. The machining program 6 is configured with the inclusion of a plurality of command blocks. The machining program 6 specifies at least a path for the drive target. The path specified by the machining program 6 is called a "command path". The analysis data is necessary information for movement of each command block and it includes the movement amount of each shaft, command feed velocity, and command information (for example, a G code).

The first interpolation unit 11 generates and outputs interpolation data on the basis of the analysis data. In addition to the data that shows a movement amount per control cycle, the interpolation data also includes information that is to be used for generating a combined-velocity calculated value (described later), e.g., a terminal-point target velocity.

The parameter changing unit 14 monitors a state quantity related to the motor 3 while the motor 3 is being controlled and changes a parameter for driving the motor 3 on the basis of the state quantity and the analysis data while the motor 3 is under control.

In the first embodiment, the parameter to be changed by the parameter changing unit 14 is specifically an acceleration, and the state quantity is specifically an inertia ratio. The inertia ratio is a ratio of inertia of the mechanical system 5 relative to the inertia of the motor 3. The inertia of the motor 3 is already known. In this example, the inertia ratio is estimated by the amplifier 2. The parameter changing unit 14 obtains the inertia ratio from the amplifier 2. It is possible to employ any method as an inertia-ratio estimating method as long as the inertia ratio is estimated while a machining program is being executed. It is possible, for example, to employ a method using recursive least squares as described in Patent Literature 2 or a method calculating the inertia ratio from the ratio between acceleration and torque while under acceleration or deceleration as an inertia-ratio estimating method. In this example, the acceleration can be a negative value.

The pre-interpolation acceleration-deceleration processing unit 12 performs an acceleration-deceleration process on a tangential velocity along a command path (i.e., a combined velocity) on the basis of the interpolation data and an acceleration (i.e., an acceleration set value) input from the parameter changing unit 14. Specifically, when the acceleration set value is changed by the parameter changing unit 14, the pre-interpolation acceleration-deceleration processing unit 12 calculates a combined velocity (i.e., the combined-velocity calculated value) so as to accelerate or decelerate the motor 3 at the changed acceleration set value. The pre-interpolation acceleration-deceleration processing unit 12 outputs the combined-velocity calculated value.

The second interpolation unit 13 interpolates the amount of movement of each shaft on the basis of the interpolation data and the combined-velocity calculated value, thereby generating a position command per control cycle. Specifically, for example, the second interpolation unit 13 generates each of the position commands such that the combined velocity on the basis of the position commands become identical to the combined-velocity calculated value. In other words, the second interpolation unit 13 generates each of the position commands to drive the motor 3 at a velocity obtained after the acceleration-deceleration process.

The filtering unit 15 performs a filtering process on the respective position commands so as to smooth the velocity waveform on the basis of each of the position commands. The filtering unit 15 outputs a position command after the filtering process to the amplifier 2. The filtering process can be performed by any method as long as it can at least make the velocity waveform smooth. It is possible, for example, to employ a moving average filter as the filtering process.

The amplifier 2 drives the motor 3 in such a manner that the motor position or the position of the load 4 corresponds to an input position command.

Figure 2:
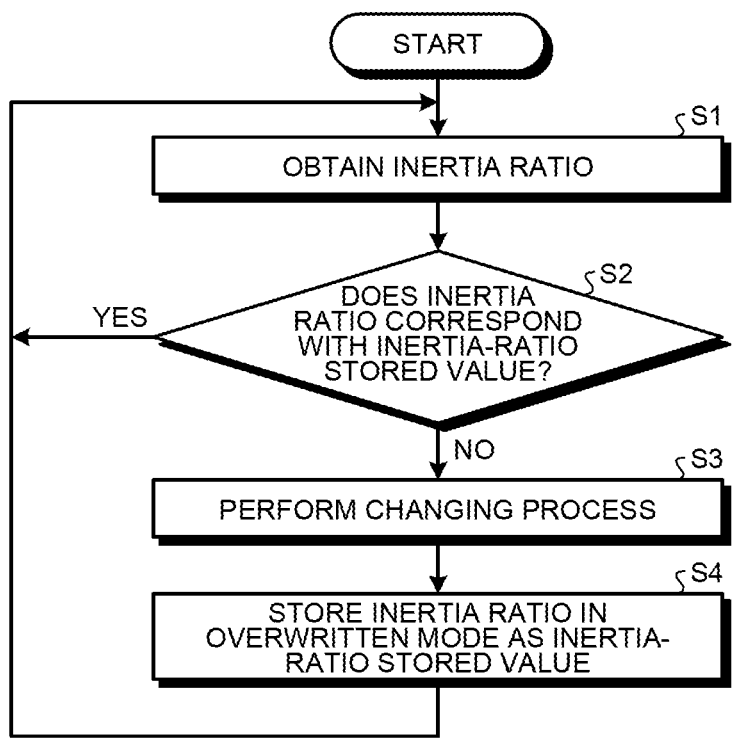
FIG. 2 is a flowchart explaining the operation of a parameter changing unit in the first embodiment.

FIG. 2 is a flowchart explaining the operation of the parameter changing unit 14 in the first embodiment. The parameter changing unit 14 can store the inertia ratio therein. The inertia ratio stored in the parameter changing unit 14 is referred to as an "inertia-ratio stored value".

First, the parameter changing unit 14 obtains an inertia ratio from the amplifier 2 (Step S1). The parameter changing unit 14 then determines whether the obtained inertia ratio corresponds to the inertia-ratio stored value (Step S2). When the obtained inertia ratio does not correspond to the inertia-ratio stored value (NO at Step S2), the parameter changing unit 14 performs a changing process of changing the acceleration set value (Step S3). The parameter changing unit 14 then stores therein the obtained inertia ratio in overwritten mode as the inertia-ratio stored value (Step S4), and performs Step S1 again. When the obtained inertia ratio corresponds to the inertia-ratio stored value (YES at Step S2), the parameter changing unit 14 skips Steps S3 and S4.

Figure 3:
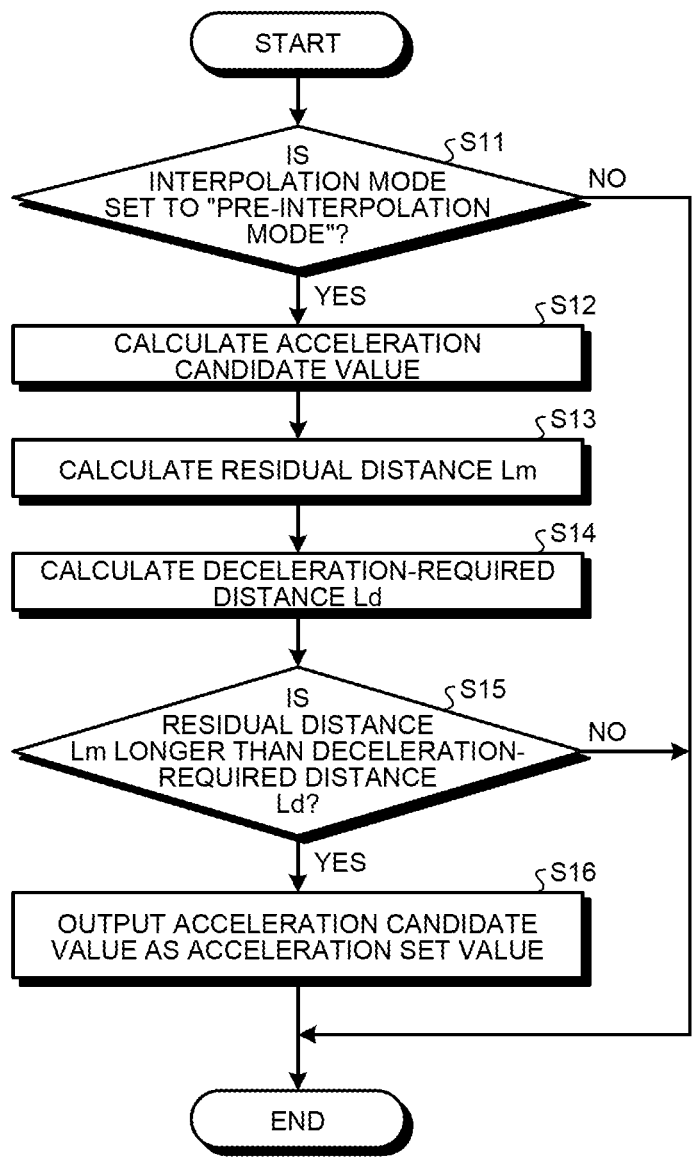
FIG. 3 is a flowchart explaining the changing process in the first embodiment.

FIG. 3 is a flowchart explaining the changing process in the first embodiment.

First, the parameter changing unit 14 determines whether the interpolation mode is set to "pre-interpolation mode" (Step S11). The setting of the interpolation mode is described in the machining program 6. By referring to the analysis data, the parameter changing unit 14 can determine whether the interpolation mode is set to "pre-interpolation mode". The "pre-interpolation mode" is a mode for executing an acceleration-deceleration control before the interpolation. When the interpolation mode is not set to "pre-interpolation mode" (NO at Step S11), the parameter changing unit 14 finishes the changing process.

When the interpolation mode is set to "pre-interpolation mode" (YES at Step S11), the parameter changing unit 14 calculates an acceleration candidate value (Step S12). An acceleration candidate value A is calculated, for example, using the following equation (1).

$$A = A0 * (J0/J) \tag{1}$$

In this equation, J is an inertia-ratio of the current value (i.e., the inertia-ratio obtained by the processing at Step S1). And, A0 represents an acceleration reference value, and J0 represents an inertia ratio when the acceleration reference value is set (i.e., an inertia-ratio reference value). The acceleration reference value A0 and the inertia-ratio reference value J0 are stored in the parameter changing unit 14 in advance. It is also possible to have a configuration that provides in the parameter changing unit 14 in advance a table in which the corresponding inertia ratios and accelerations are collated; and the parameter changing unit 14 refers to the table using the obtained inertia ratio as a search key so as to calculate an acceleration candidate value.

Subsequently, the parameter changing unit 14 calculates a residual distance Lm from the present position to a target position by using analysis data obtained from the program analysis unit 10 and by using a combined-velocity calculated value obtained from the pre-interpolation acceleration-deceleration processing unit 12 (Step S13). For example, the target position is specified in the machining program 6 and is therefore described in the analysis data. The parameter changing unit 14 calculates the deceleration-required distance Ld by using the acceleration candidate value (Step S14). The deceleration-required distance Ld is the distance required to reduce the velocity at the present position to the velocity at the target position.

Next, the parameter changing unit 14 determines whether the residual distance Lm is longer than the deceleration-required distance Ld (Step S15). That is, at Step S15, the parameter changing unit 14 determines whether it is possible for a drive target to be moved to the target position at the acceleration candidate value. When the residual distance Lm is shorter than the deceleration-required distance Ld (NO at Step S15), the parameter changing unit 14 finishes the changing process. When the residual distance Lm is longer than the deceleration-required distance Ld (YES at Step S15), the parameter changing unit 14 outputs the acceleration candidate value as an acceleration set value to the pre-interpolation acceleration-deceleration processing unit 12 (Step S16), and then finishes the changing process.

Figure 4:
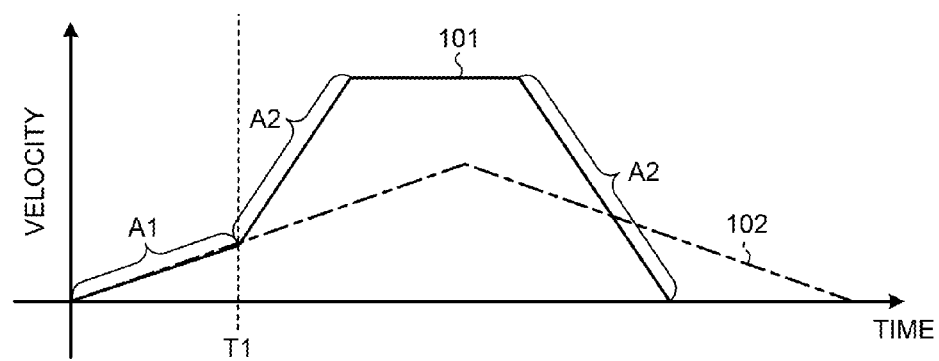
FIG. 4 is a diagram illustrating an example of a combined velocity waveform.
Figure 5:
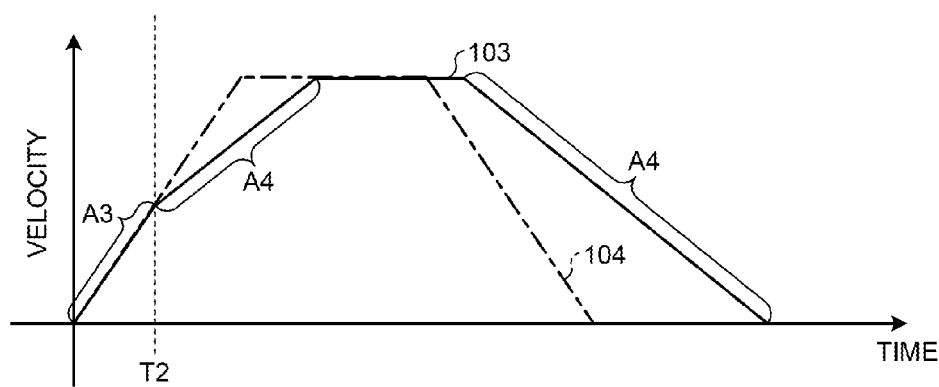
FIG. 5 is a diagram illustrating an example of a combined velocity waveform.

FIGS. 4 and 5 are diagrams illustrating examples of combined velocity waveforms. Solid lines 101 and 103 indicate a transition of the combined velocity according to the first embodiment. Dot-and-dash lines 102 and 104 indicate a transition of the combined velocity when the first embodiment is not applied.

As indicated by the solid line 101, acceleration starts at an acceleration set value A1. At a time T1 while under acceleration, a change in the inertia ratio is detected. In this example, the inertia ratio is decreased. As a result, the parameter changing unit 14 changes the acceleration set value A1 to A2, which is greater than A1. The pre-interpolation acceleration-deceleration processing unit 12 calculates a combined-velocity calculated value using the acceleration set value A2 at the time T1 and later. Therefore, while under acceleration, the combined-velocity calculated value forms a velocity waveform with more abrupt acceleration. Due to this velocity waveform, for example while the machining program 6 is being executed, in a case where the inertia of a workpiece is significantly decreased due to cutting operations, the combined-velocity calculated value as illustrated in FIG. 4 is automatically generated. Therefore, this makes it possible to generate a position command with a higher time-reduction effect when compared to the case where the acceleration set value A1 is always used. In the same way, while under constant velocity and while under deceleration, a command with a higher time-reduction effect can also be generated.

As indicated by the solid line 103 in FIG. 5, acceleration starts at an acceleration set value A3. The inertia ratio is increased while under acceleration, and at a time T2 while under acceleration, a change in the inertia ratio is detected. As a result, the parameter changing unit 14 changes the acceleration set value A3 to A4, which is smaller than A3. The pre-interpolation acceleration-deceleration processing unit 12 calculates a combined-velocity calculated value using the acceleration set value A4 at the time T2 and later. Therefore, while under acceleration, the combined-velocity calculated value forms a velocity waveform with more moderate acceleration. Due to this velocity waveform, in a case where the inertia is increased by replacing a light-weight workpiece with a heavy-weight workpiece, the combined-velocity calculated value as illustrated in FIG. 5 is generated. Therefore, a command with higher vibration-suppression and overload-prevention effects can be generated when compared to the case where the acceleration set value A3 is always used. In the same way, while under constant velocity and under deceleration, a command with higher vibration-suppression and overload prevention effects can also be generated.

As described above, according to the first embodiment, the parameter changing unit 14 changes the acceleration of the motor 3 according to the inertia ratio as a state quantity of the motor 3. Therefore, it is possible to reduce the cycle time when the inertia of a workpiece is decreased during machining. Further, it is possible to prevent the generation of vibrations and overloading when the inertia of a workpiece is increased during machining. That is, without changing the acceleration on the basis of the results of trial executions of the machining program 6 one or more times, it is possible to dynamically change the acceleration during the execution of the machining program 6.

The parameter changing unit 14 calculates an acceleration candidate value according to the inertia ratio and determines whether it is possible for a drive target to be moved to a target position at the calculated acceleration candidate value. When the parameter changing unit 14 determines that it is possible for a drive target to be moved to a target position at the calculated acceleration candidate value, the parameter changing unit 14 changes the acceleration set value to this acceleration candidate value. This makes it possible to prevent a drive target from being moved to a position that is passed the target position.

The parameter changing unit 14 obtains the inertia ratio of the mechanical system 5 as a state quantity for changing the acceleration. It is also possible that the parameter changing unit 14 is configured to obtain the inertia of the mechanical system 5 (or the load 4) from the amplifier 2 to convert the obtained inertia to an inertia ratio. It is also possible to configure the parameter changing unit 14 to change the time constant instead of changing the acceleration.

The parameter changing unit 14 as has been described here calculates an acceleration candidate value according to the equation (1). It is also possible to configure the parameter changing unit 14 to calculate an acceleration candidate value when the inertia ratio is increased in such a manner that the acceleration candidate value becomes smaller than the acceleration set value at that time point. It is also possible to configure the parameter changing unit 14 to calculate an acceleration candidate value when the inertia ratio is decreased in such a manner that the acceleration candidate value becomes higher than the acceleration set value at that time point. Furthermore, it is also possible to configure the parameter changing unit 14 to change the acceleration set value in either case where the inertia ratio is increased or where the inertia ratio is decreased.

In a case where the numerical control device 1 synchronously drives a plurality of shafts, the parameter changing unit 14 calculates an acceleration candidate value for each of the shafts. The parameter changing unit 14 then uses the minimum value of the acceleration candidate values for each of the respective shafts in order to perform the changing process.

Second Embodiment

Figure 6:
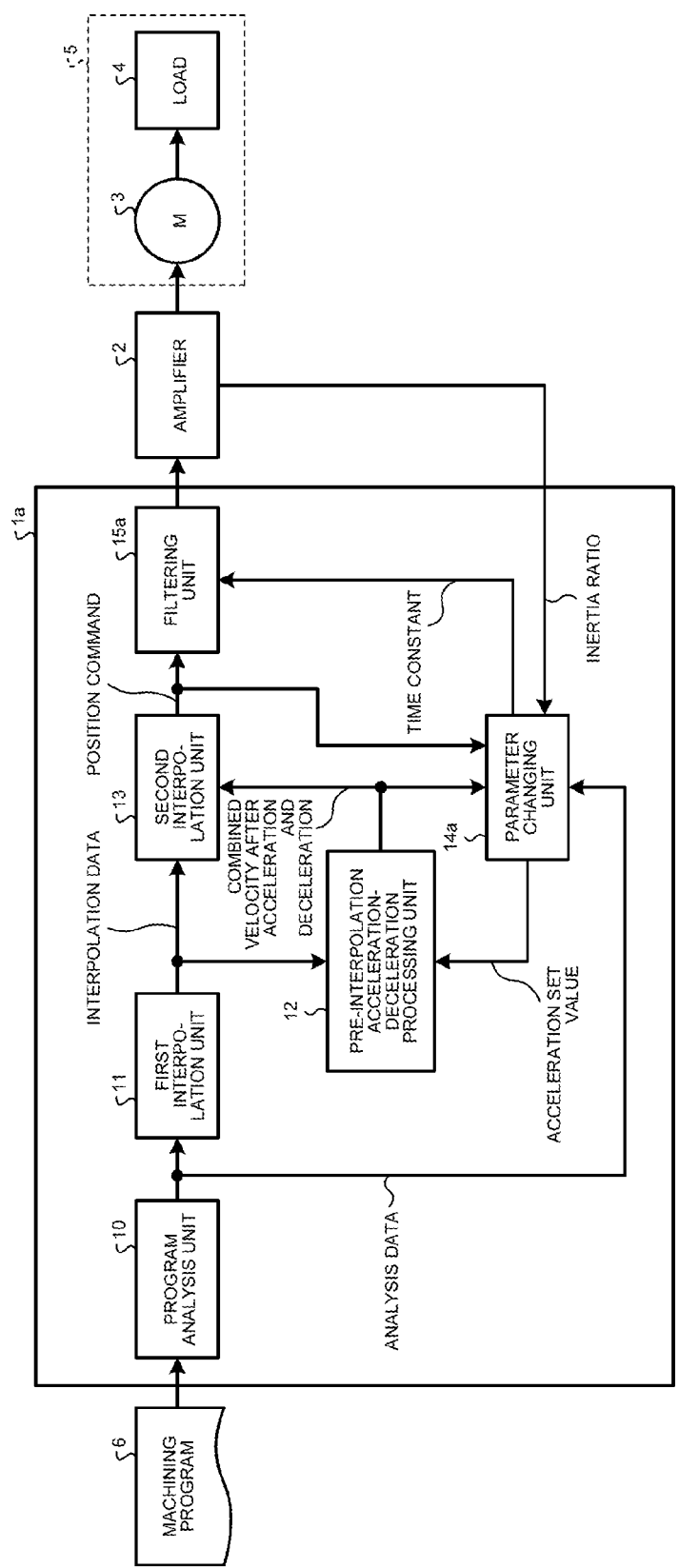
FIG. 6 is a diagram illustrating a configuration of a numerical control device according to a second embodiment.

FIG. 6 is a diagram illustrating a configuration of a numerical control device according to a second embodiment. In the descriptions of the second and subsequent embodiments, constituent elements equivalent to those of the first embodiment are denoted with like names and reference signs and redundant descriptions thereof will be omitted.

A numerical control device 1a is connected to the amplifier 2. The amplifier 2 supplies a drive current to the motor 3 to which the load 4 is connected. The motor 3 and the load 4 constitute the mechanical system 5. The numerical control device 1a includes the program analysis unit 10, the first interpolation unit 11, the pre-interpolation acceleration-deceleration processing unit 12, the second interpolation unit 13, a parameter changing unit 14a, and a filtering unit 15a.

The filtering unit 15a is configured to be capable of externally changing the time constant (a time-constant set value) of a filtering process. The parameter changing unit 14a can change the time-constant set value according to a state quantity. In this example, the state quantity indicates the inertia ratio in the same way as the first embodiment. As the time-constant set value is greater, the acceleration (more precisely, the absolute value of acceleration) becomes lower. As the time-constant set value is smaller, the acceleration (more precisely, the absolute value of acceleration) becomes higher. When the inertia ratio is increased, the parameter changing unit 14a calculates a new time-constant set value such that the time constant becomes greater than the time-constant set value at that time point. When the inertia ratio is decreased, the parameter changing unit 14a calculates a new time-constant set value such that the time constant becomes smaller than the time-constant set value at that time point.

Figure 7:
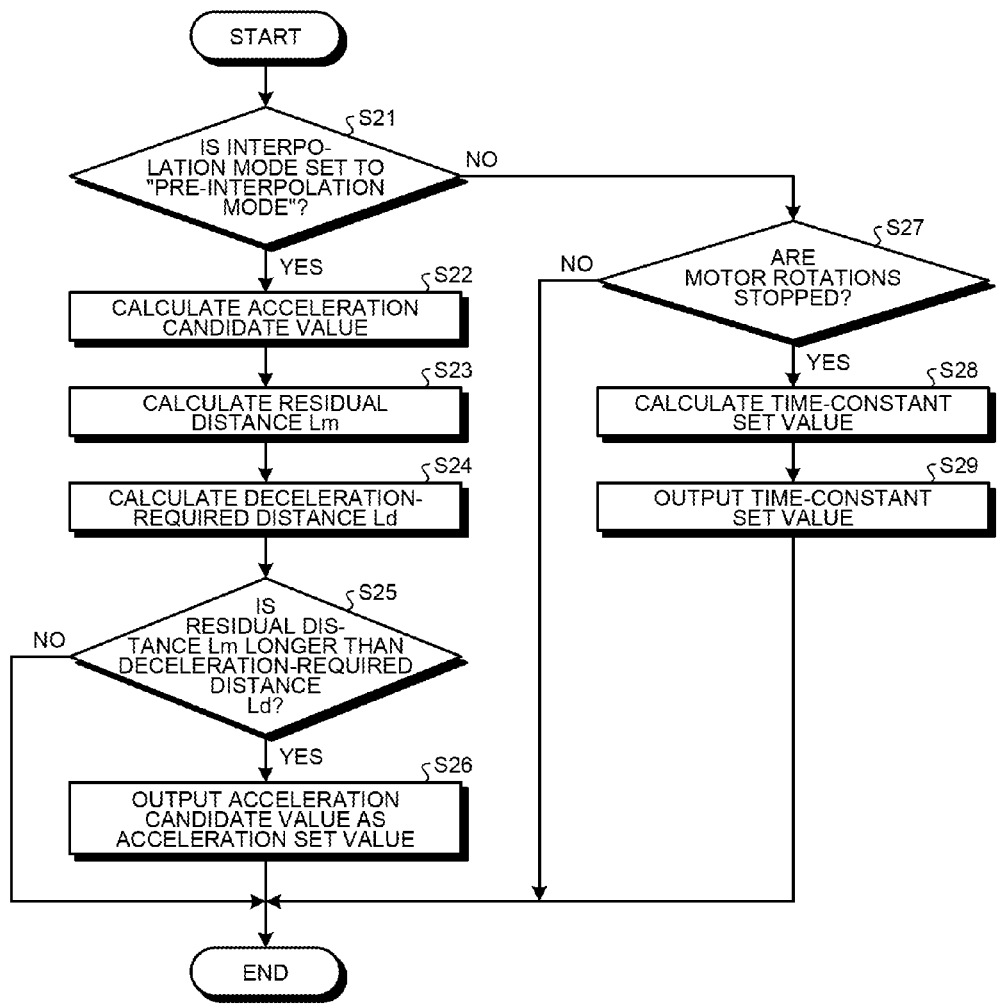
FIG. 7 is a flowchart explaining the operation of a parameter changing unit according to the second embodiment.

FIG. 7 is a flowchart explaining an operation of the parameter changing unit 14a according to the second embodiment.

First, the parameter changing unit 14a determines whether the interpolation mode is set to "pre-interpolation mode" (Step S21). When the interpolation mode is set to "pre-interpolation mode" (YES at Step S21), processes identical to Steps S12 to S16 are performed at Steps S22 to S26, respectively.

When the interpolation mode is not set to "pre-interpolation mode" (NO at Step S21), the parameter changing unit 14a refers to a position command from the second interpolation unit 13 to determine whether rotations of the motor 3 are stopped (Step S27). When rotations of the motor 3 are not stopped (NO at Step S27), the parameter changing unit 14a finishes the changing process.

When rotations of the motor 3 are stopped (YES at Step S27), the parameter changing unit 14a calculates a time-constant set value (Step S28). A time-constant set value tc is calculated using the following equation (2), for example.

$$tc=tc0*(J/J0) \qquad (2)$$

In this equation, tc0 represents a time-constant reference value, which is a value adjusted using the inertia-ratio reference value J0. The time-constant reference value is set in the parameter changing unit 14a in advance.

Subsequently, the parameter changing unit 14a outputs the calculated time-constant set value tc to the filtering unit 15a (Step S29), and then finishes the changing process.

As described above, according to the second embodiment, the parameter changing unit 14a can change the acceleration by changing the time constant of the filtering process performed by the filtering unit 15a.

In a case where the numerical control device 1a synchronously drives a plurality of shafts, the parameter changing unit 14a calculates the time-constant set value tc to each of the shafts. The parameter changing unit 14 then outputs the maximum value of the time-constant set values tc to the respective shafts to the filtering unit 15a.

Third Embodiment

Figure 8:
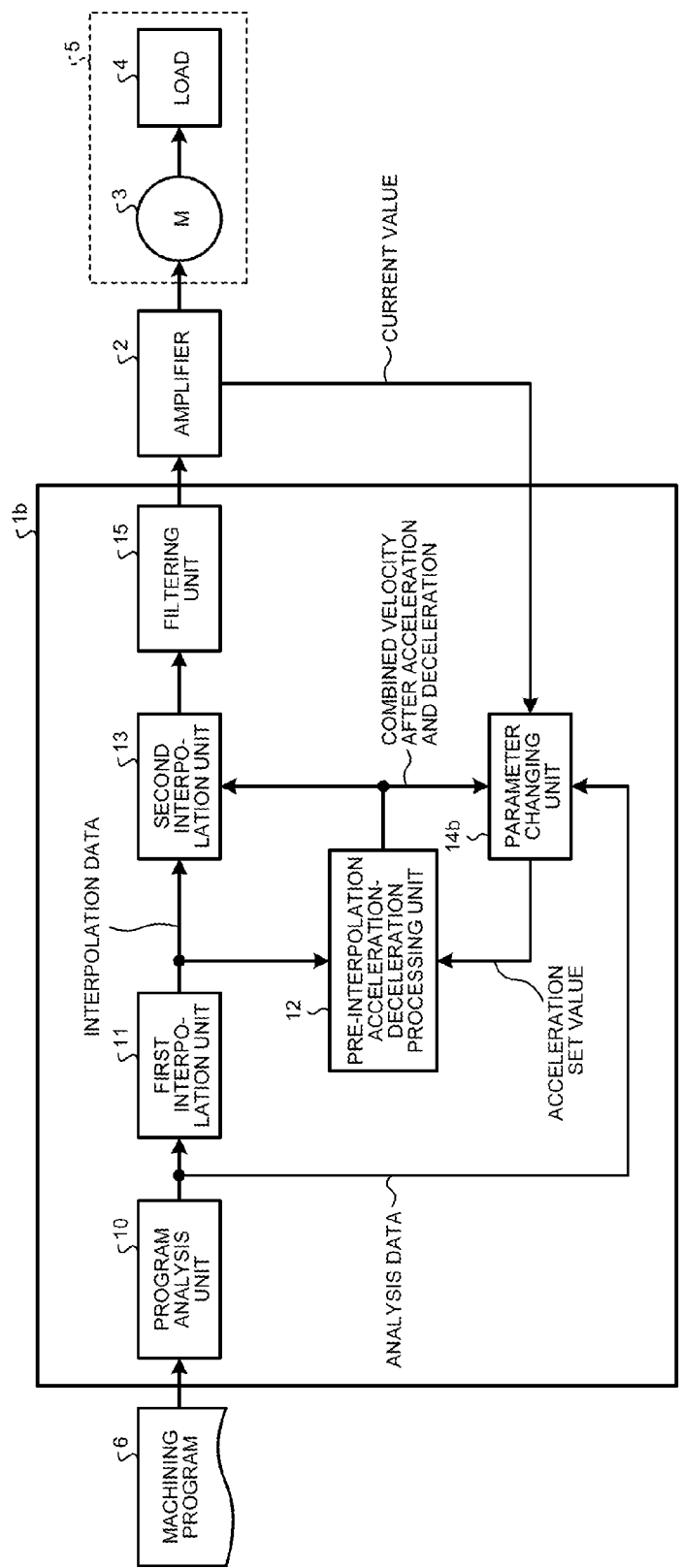
FIG. 8 is a diagram illustrating a configuration of a numerical control device according to a third embodiment.

FIG. 8 is a diagram illustrating a configuration of a numerical control device according to a third embodiment. A numerical control device 1b is connected to the amplifier 2. The amplifier 2 supplies a drive current to the motor 3 to which the load 4 is connected. The motor 3 and the load 4 constitute the mechanical system 5. The numerical control device 1b includes the program analysis unit 10, the first interpolation unit 11, the pre-interpolation acceleration-deceleration processing unit 12, the second interpolation unit 13, a parameter changing unit 14b, and the filtering unit 15.

In the third embodiment, as a state quantity for converting a parameter, a current value that is output from the amplifier 2 to the motor 3 is used. The parameter changing unit 14b converts the current value to a load value of the motor 3. The load value of the motor 3 is proportional to the square of the current value. The load value becomes greater as the acceleration is higher. Further, the load value becomes greater as the inertia ratio is higher. For example, in an attempt to drive the load 4 having a large inertia at a high acceleration, the motor 3 is overloaded. When the motor 3 is overloaded, there is a possibility for the motor 3 or the mechanical system 5 to be defective. In the parameter changing unit 14b, an overload threshold Xth for determining whether the motor 3 is overloaded is set in advance. Upon detecting an overload, the parameter changing unit 14b changes the acceleration set value.

Figure 9:
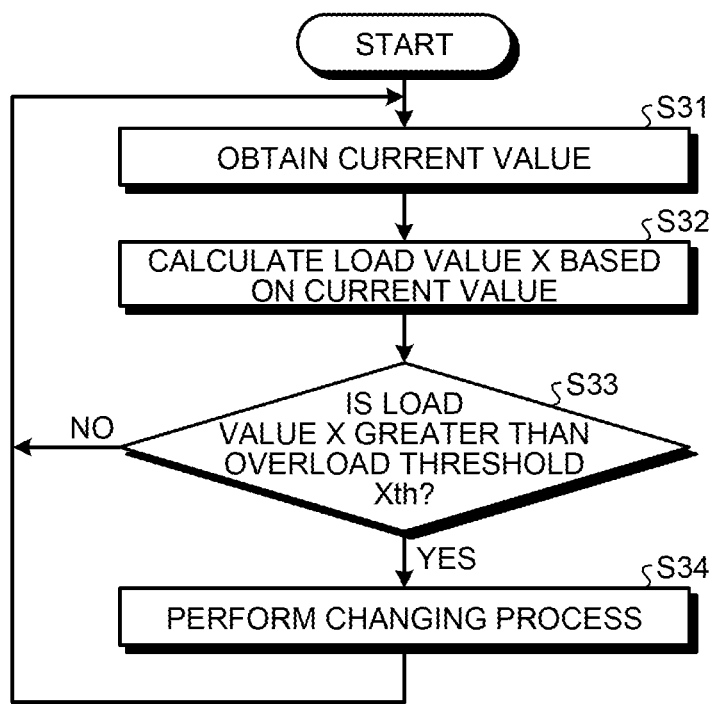
FIG. 9 is a flowchart explaining the operation of a parameter changing unit according to the third embodiment.

FIG. 9 is a flowchart explaining an operation of the parameter changing unit 14b according to the third embodiment.

First, the parameter changing unit 14b obtains a current value from the amplifier 2 (Step S31). The parameter changing unit 14b then calculates a load value X from the obtained current value (Step S32). The parameter changing unit 14b then determines whether the load value X is greater than the overload threshold Xth (Step S33). When the load value X is greater than the overload threshold Xth (YES at Step S33), the parameter changing unit 14b performs the changing process (Step S34), and then performs Step S31 again. When the load value X is smaller than the overload threshold Xth (NO at Step S33), the parameter changing unit 14b skips Step S34.

The changing process in the third embodiment is performed in the same manner as in the first embodiment. In the changing process in the third embodiment, an acceleration candidate value is calculated, that is at least smaller than the acceleration set value having been set immediately before. It is also possible that, as an acceleration candidate value, a predetermined value is used, which is set to a degree that does not overload the motor 3.

Conventionally, when an overload is detected, a procedure to stop the operation is adopted. Therefore, the work time is increased. According to the third embodiment, the parameter changing unit 14b changes the acceleration set value according to the load value. Due to the third embodiment, even when a light-weight workpiece is replaced with a heavy-weight workpiece for example, the acceleration is switched over while under acceleration before the motor 3 is overloaded. This makes it possible to prevent an overload, and eliminate the need for the procedure to stop the operation due to an overload.

It is also possible to configure that, upon detecting an overload, the parameter changing unit 14b changes the time constant of the filtering process in the filtering unit 15. Specifically, upon detecting an overload, the parameter changing unit 14b changes the time constant to a greater value.

Further, it is also possible to configure that, when the load value is increased, the parameter changing unit 14b changes the acceleration set value to a smaller value. It is also possible to configure that, when the load value is decreased, the parameter changing unit 14b changes the acceleration set value to a greater value. Furthermore, it is also possible that, when the load value is increased, the parameter changing unit 14b changes the time constant to a greater value. It is also possible that, when the load value is decreased, the parameter changing unit 14b changes the time constant to a smaller value.

Fourth Embodiment

Figure 10:
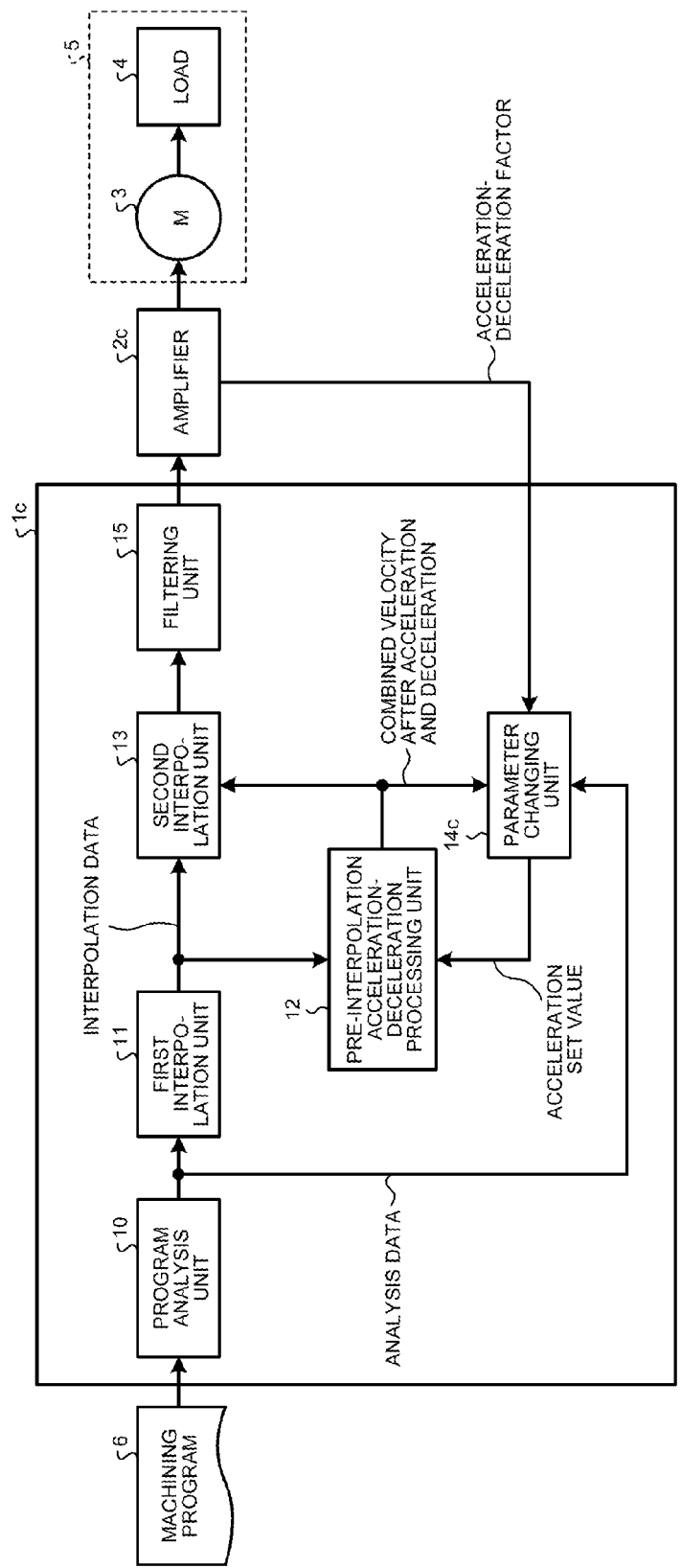
FIG. 10 is a diagram illustrating a configuration of a numerical control device according to a fourth embodiment.

FIG. 10 is a diagram illustrating a configuration of a numerical control device according to a fourth embodiment. A numerical control device 1c is connected to the amplifier 2c. The amplifier 2c supplies a drive current to the motor 3 to which the load 4 is connected. The motor 3 and the load 4 constitute the mechanical system 5. The numerical control device 1c includes the program analysis unit 10, the first interpolation unit 11, the pre-interpolation acceleration-deceleration processing unit 12, the second interpolation unit 13, a parameter changing unit 14c, and the filtering unit 15.

In the fourth embodiment, an acceleration-deceleration factor is used as a state quantity for changing the acceleration set value. In this example, the amplifier 2c calculates and outputs an acceleration-deceleration factor. Upon detecting a change in the acceleration-deceleration factor, the parameter changing unit 14c performs the changing process. It is also possible to configure that the acceleration-deceleration factor is input from a device other than the amplifier 2c. For example, a user can manually input the acceleration-deceleration factor through an operating panel.

The changing process in the fourth embodiment is performed in the same manner as in the first embodiment. In the changing process in the fourth embodiment, the parameter changing unit 14c multiplies the acceleration reference value A0 by the acceleration-deceleration factor to define the obtained value as an acceleration candidate value.

As described above, according to the fourth embodiment, the parameter changing unit 14c changes the acceleration to a value obtained by multiplying a predetermined acceleration reference value by an externally-input acceleration-deceleration factor. Due to this calculation, it is possible to change the acceleration according to the acceleration-deceleration factor even while under the execution of the machining program 6.

It is also possible to configure that the parameter changing unit 14c changes the time constant of the filtering process in the filtering unit 15 according to the acceleration-deceleration factor. For example, when the value of acceleration-deceleration factor is larger than 1, the parameter changing unit 14c changes the time constant to a value smaller than the time constant at that time point. For another example, when the value of acceleration-deceleration factor is smaller than 1, the parameter changing unit 14c changes the time constant to a value greater than the time constant at that time point. Further, it is also possible to configure that a time-constant factor is externally input to the parameter changing unit 14c, and according to the input time-constant factor, the parameter changing unit 14c changes the time constant of the filtering process in the filtering unit 15. That is, the parameter changing unit 14c computes a new time constant on the basis of the externally-input parameter and the time constant that is set at that time point, and then updates the time constant that is set at that time point to the new time constant.

Furthermore, it is also possible to configure that at least two types of state quantities that are the inertia ratio, the current value of the motor 3, and the acceleration-deceleration factor, are input to the parameter changing unit 14c. Specifically, a determination condition and a priority are set to each type of the state quantities. Step S2 corresponds to a determination condition for the inertia ratio. Step S33 corresponds to a determination condition for the current value. A determination condition for the acceleration-deceleration factor is that the parameter changing unit 14c detects a change in the acceleration-deceleration factor. It is possible that, when respective determination conditions for two or more types of state quantities are satisfied simultaneously, the parameter changing unit 14c changes the acceleration or the time constant according to the highest-priority state quantity. For example, in a case where a determination condition for the inertia ratio of the mechanical system 5, and a determination condition for the current value are satisfied simultaneously, when it is desired to assign a higher priority to stable operation, then the acceleration or the time constant is changed on the basis of the current value. Therefore, the vibration-suppression and overload-prevention effects can be obtained. The acceleration is then changed according to the inertia ratio of the mechanical system 5, and therefore the time-reduction effect can be obtained.

Fifth Embodiment

Figure 11:
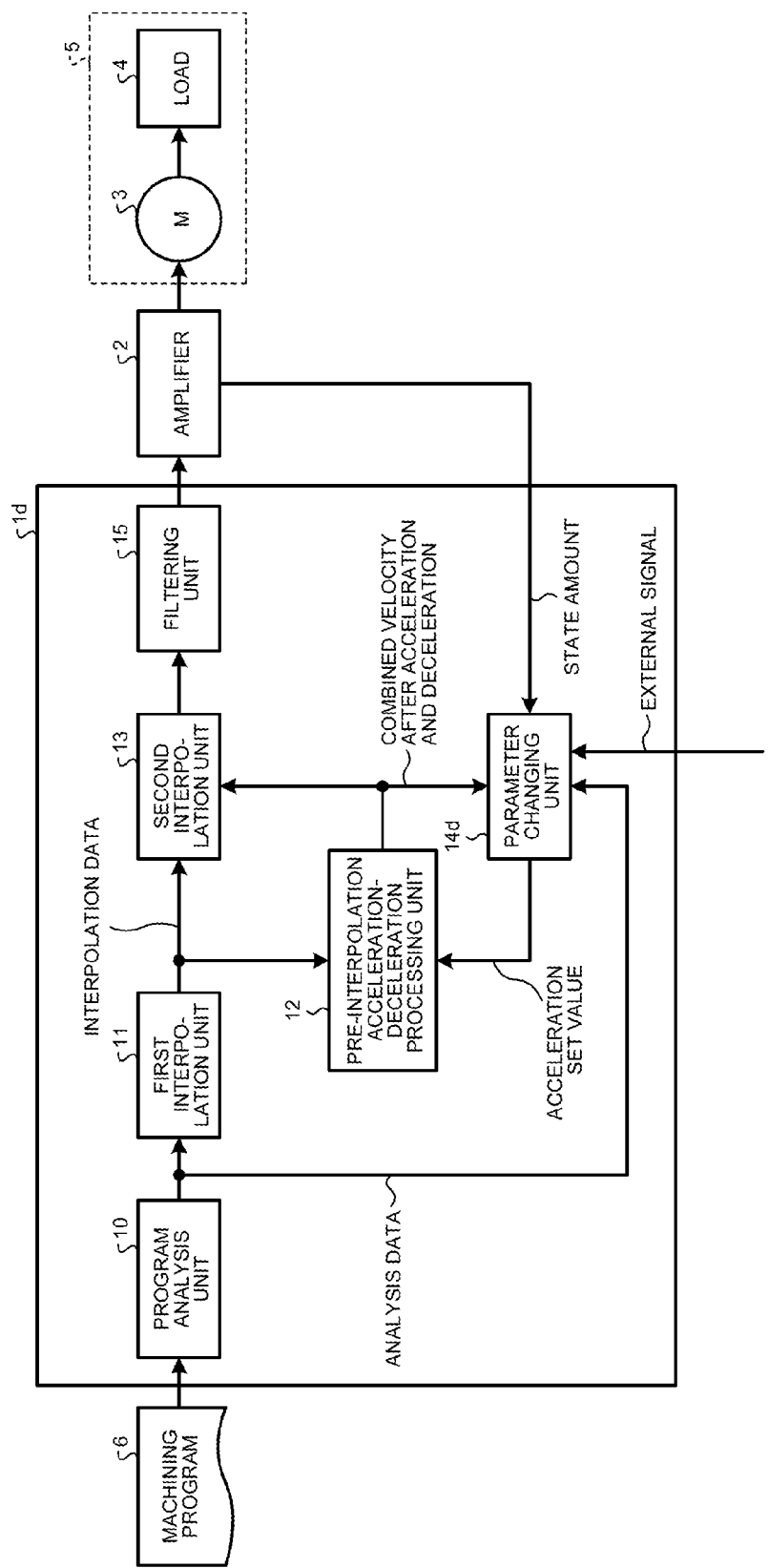
FIG. 11 is a diagram illustrating a configuration of a numerical control device according to a fifth embodiment.

FIG. 11 is a diagram illustrating a configuration of a numerical control device according to a fifth embodiment. A numerical control device 1d is connected to the amplifier 2. The amplifier 2 supplies a drive current to the motor 3 to which the load 4 is connected. The motor 3 and the load 4 constitute the mechanical system 5. The numerical control device 1d includes the program analysis unit 10, the first interpolation unit 11, the pre-interpolation acceleration-deceleration processing unit 12, the second interpolation unit 13, a parameter changing unit 14d, and the filtering unit 15.

In the fifth embodiment, the parameter changing unit 14d can perform a resetting process when a specific external signal is input to the parameter changing unit 14d, or when it reads a specific auxiliary code command. The resetting process is a process of resetting the acceleration set value to a predetermined value. As an external signal for the resetting process, it is possible to employ any signal such as a reset signal, a single block signal, or a feed hold signal. An auxiliary code command for the resetting process is described in the machining program 6. The program analysis unit 10 describes the auxiliary code command described in the machining program 6 to analysis data. The parameter changing unit 14d can read the auxiliary code command from the analysis data.

For example, when an auxiliary code command for tool replacement is given, the inertia is changed due to the tool replacement. Therefore, at the time of the next operation, the inertia is estimated to switch over the acceleration. As an acceleration in the operation when the inertia is estimated, the acceleration set value before the switchover is used. Therefore, there is a possibility of the occurrence of an overload or oscillations depending on the acceleration set value. According to the fifth embodiment, when a tool-replacement command is given, the parameter changing unit 14d determines whether to perform the resetting process on the basis of an auxiliary code command given along with the tool-replacement command. When the parameter changing unit 14d determines to perform the resetting process, it switches over the acceleration to the predetermined acceleration. An acceleration, which has been found in advance not to cause vibrations or an overload, is predetermined. This makes it possible to suppress an overload and oscillations at the time of tool replacement.

It is also possible to configure that the parameter changing unit 14d performs a time-constant resetting process when a specific external signal is input to the parameter changing unit 14d, or when it reads a specific auxiliary code command. The time-constant resetting process is a process of resetting the time-constant set value to a predetermined value.

Further, it is also possible to configure that, when the parameter changing unit 14d reads a specific operation command, it stops switching over the acceleration or the time constant during the operation period according to the specific operation command. For example, there is an operation such as synchronized tapping or threading, in which a switchover in acceleration is not desired. In this case, a user can add an auxiliary code for stopping the switchover in acceleration before such an operation as described, and also add an auxiliary code for starting the switchover in acceleration after such an operation as described. Upon reading the auxiliary code, the parameter changing unit 14d stops or starts switching over the acceleration.

Further, it is also possible that a specific operation command is configured to be capable of being defined in the machining program 6, or being set in the parameter changing unit 14d, in advance as stopping the switchover in acceleration or time constant during the execution period of the specific operation command. Upon reading the specific operation command, the parameter changing unit 14d stops switching over the acceleration or the time constant.

Each functional block that constitutes the numerical control device according to the first to fifth embodiments can be implemented by either hardware or software, or by a combination of both. "Implementing each functional block by software" refers to, in a computer that includes a computation device and a storage device, storing a program module that corresponds to a constituent element in the storage device, and executing the program module stored in the storage device by the computation device, thereby implementing a function of the constituent element.

REFERENCE SIGNS LIST 1, 1a, 1b, 1c, 1d numerical control device, 2, 2c amplifier, 3 motor, 4 load, 5 mechanical system, 6 machining program, 10 program analysis unit, 11 first interpolation unit, 12 pre-interpolation acceleration-deceleration processing unit, 13 second interpolation unit, 14, 14a, 14b, 14c, 14d parameter changing unit, 15, 15a filtering unit, 101, 103 solid line, 102, 104 dot-and-dash line.

The invention claimed is:

1. A numerical control device that controls a motor according to a program that specifies a path for a drive target of the motor, the numerical control device comprising:
an acceleration-deceleration processing unit:
to perform an acceleration-deceleration process on a velocity at which the drive target is moved on the path on the basis of an acceleration set value at the time point and
to output a velocity obtained after the acceleration-deceleration process;
an interpolation unit to calculate a position command per control cycle for the motor so as to drive the motor at the velocity obtained after the acceleration-deceleration process; and
a changing unit:
to monitor a state quantity related to the motor while the motor is being controlled, and
to change the acceleration set value on the basis of the state quantity while the motor is being controlled, wherein
the changing unit:
acquires an acceleration candidate value on the basis of the state quantity,
acquires a required distance for reducing a velocity of the drive target from a present value to a velocity at a target position specified in the program by using the acceleration candidate value,
determines whether it is possible for the drive target to be moved to the target position at the acceleration candidate value on the basis of the required distance and a distance from a present position of the drive target to the target position,
changes the acceleration set value to the acceleration candidate value when it is determined to be possible for the drive target to be moved to the target position at the acceleration candidate value, and
leaves the acceleration set value unchanged when it is determined to be impossible for the drive target to be moved to the target position at the acceleration candidate value.

2. The numerical control device according to claim 1, wherein
the state quantity is an inertia ratio, and
the changing unit
changes the acceleration set value to a smaller value when the inertia ratio is changed to a greater value, or
changes the acceleration set value to a greater value when the inertia ratio is changed to a smaller value.

3. The numerical control device according to claim 1, wherein
the state quantity is a current value of the motor, and
the changing unit
calculates a load value of the motor on the basis of the current value, and
when the load value is changed to a greater value, the changing unit changes the acceleration set value to a smaller value, or
when the load value is changed to a smaller value, the changing unit changes the acceleration set value to a greater value.

4. The numerical control device according to claim 1, wherein
the state quantity is a current value of the motor, and
the changing unit
calculates a load value of the motor on the basis of the current value, and
changes, when the load value exceeds a predetermined overload threshold, the acceleration set value to a value smaller than the acceleration set value at the time point when the load value exceeds.

5. The numerical control device according to claim 1, wherein
the state quantity is an acceleration-deceleration factor that is externally input, and
the changing unit changes the acceleration set value to a value obtained by multiplying a predetermined acceleration reference value by the acceleration-deceleration factor.

6. The numerical control device according to claim 1, wherein
the state quantities include at least two types out of an inertia ratio, an acceleration-deceleration factor that is externally input, and a current value of the motor, priorities of which are defined for each type, and determination conditions of which are defined for each type, and
the changing unit changes the acceleration set value according to a higher-priority type of state quantity when respective determination conditions for a plurality of state quantities are simultaneously satisfied.

7. The numerical control device according to claim 1, further comprising:
an interpolation unit to calculate a position command per control cycle for the motor; and
a filtering unit to perform a filtering process on the position command per control cycle, wherein
the program includes designation of first mode or second mode, and
the changing unit:
changes the acceleration set value when the first mode is designated, and
changes a time constant of the filtering process on the basis of the state quantity when the second mode is designated.

8. The numerical control device according to claim 7, wherein
the state quantity is an inertia ratio, and
the changing unit
changes the time constant to a greater value when the inertia ratio is changed to a greater value, or
changes the time constant to a smaller value when the inertia ratio is changed to a smaller value.

9. The numerical control device according to claim 7, wherein
the state quantity is a current value of the motor, and
the changing unit
calculates a load value of the motor on the basis of the current value, and
the changing unit
changes the time constant to a greater value when the load value is changed to a greater value, or
changes the time constant to a smaller value when the load value is changed to a smaller value.

10. The numerical control device according to claim 7, wherein
the state quantity is a current value of the motor, and
the changing unit
calculates a load value of the motor on the basis of the current value, and
changes, when the load value exceeds a predetermined overload threshold, the time constant to a value greater than the time constant at the time point when the load value exceeds.

11. The numerical control device according to claim 7, wherein
the state quantity is an externally-input parameter, and
the changing unit
calculates a new time constant on the basis of the time constant and the parameter, and
changes the time constant before the calculation to the calculated new time constant.

12. The numerical control device according to claim 7, wherein
the state quantity is at least two types out of an inertia ratio, an acceleration-deceleration factor that is externally input, and a current value of the motor,
priorities of which are defined for each type, and
determination conditions of which are defined for each type, and
the changing unit changes the time constant according to a higher-priority type of state quantity when respective determination conditions for a plurality of types of the state quantities are simultaneously satisfied.

13. The numerical control device according to claim 7, wherein
when the second mode is designated, and then when the changing unit receives an external signal, or reads a preset code described in the program, the changing unit changes the time constant to a predetermined value.

14. The numerical control device according to claim 1, wherein
the changing unit changes the acceleration that is set to a predetermined set value when the changing unit receives an external signal or reads a preset code described in the program.

15. The numerical control device according to claim 1, wherein
the changing unit stops an operation of changing the set acceleration value when the changing unit reads a preset code described in the program.

16. A numerical control method for a numerical control device to control a motor according to a program that specifies a path for a drive target of the motor, the numerical control method comprising:
performing an acceleration-deceleration process on a velocity at which the drive target is moved on the path on the basis of an acceleration set value at that time point, and outputting a velocity obtained after the acceleration-deceleration process;
calculating a position command per control cycle for the motor so as for the motor to drive at the velocity obtained after the acceleration-deceleration process;
monitoring a state quantity related to the motor while the motor is being controlled; and
changing the acceleration set value on the basis of the state quantity while the motor is being controlled, wherein
the monitoring includes:
acquiring an acceleration candidate value on the basis of the state quantity,
acquiring a required distance for reducing a velocity of the drive target from a present value to a velocity at a target position specified in the program by using the acceleration candidate value,
determining whether it is possible for the drive target to be moved to the target position at the acceleration candidate value on the basis of the required distance and a distance from a present position of the drive target to the target position, and
changing the acceleration set value to the acceleration candidate value when it is determined to be possible for the drive target to be moved to the target position at the acceleration candidate value, and leaving the acceleration set value unchanged when it is determined to be impossible for the drive target to be moved to the target position at the acceleration candidate value.

* * * * *